United States Patent
Zhang et al.

(10) Patent No.: US 8,284,194 B2
(45) Date of Patent: Oct. 9, 2012

(54) METHOD AND SYSTEM FOR THREE-DIMENSIONAL MODEL ACQUISITION

(75) Inventors: Dong-Qing Zhang, Burbank, CA (US);
Hekmat Izzat, Santa Clarita, CA (US);
Mike Arthur Derrenberger, Hopkinton, MA (US)

(73) Assignee: Thomson Licensing, Boulogne-Billancourt (FR)

( * ) Notice: Subject to any disclaimer, the term of this patent is extended or adjusted under 35 U.S.C. 154(b) by 888 days.

(21) Appl. No.: 12/310,704

(22) PCT Filed: Sep. 21, 2006

(86) PCT No.: PCT/US2006/036839
§ 371 (c)(1), (2), (4) Date: Mar. 3, 2009

(87) PCT Pub. No.: WO2008/036092
PCT Pub. Date: Mar. 27, 2008

(65) Prior Publication Data
US 2009/0322745 A1 Dec. 31, 2009

(51) Int. Cl.
*G06T 17/00* (2006.01)
*H04N 13/00* (2006.01)
*H04N 13/02* (2006.01)
(52) U.S. Cl. ............ 345/420; 348/42; 348/43; 348/44; 348/46
(58) Field of Classification Search ............... 345/420; 348/42, 43, 44, 46
See application file for complete search history.

(56) References Cited

U.S. PATENT DOCUMENTS

| | | | |
|---|---|---|---|
| 4,802,759 A | 2/1989 | Matsumoto et al. | |
| 6,996,339 B2 * | 2/2006 | Miyoshi et al. | 396/175 |
| 8,050,491 B2 * | 11/2011 | Vaidyanathan | 382/154 |
| 2002/0006282 A1 | 1/2002 | Ushiro et al. | |
| 2002/0196415 A1 | 12/2002 | Shiratani | |
| 2003/0133130 A1 | 7/2003 | Takahashi | |
| 2005/0136819 A1 * | 6/2005 | Kriesel | 452/157 |

FOREIGN PATENT DOCUMENTS

EP 1067362 1/2001

(Continued)

OTHER PUBLICATIONS

Patent Abstract of Japan, JP 2003-324761, published: Nov. 14, 2003, Applicant: Toshiba Corp., Mlyagawa Ryohei et al. (See p. 1 for patent listing.).

(Continued)

*Primary Examiner* — Jeffrey Chow
(74) *Attorney, Agent, or Firm* — Robert D. Shedd; Robert B. Levy; Jorge Tony Villabon

(57) ABSTRACT

A system and method for acquiring geometric information from images includes a modulated light source configured to provide light energy at a rate unperceivable by the human eye. A camera is configured to acquire images at a rate at which a differential pair of images is obtained such that one of the pair of images includes light from the light source and the other image of the pair does not include light from the light source. A comparison module is configured to compare the differential pair of images to create a depth map for three-dimension model creation.

19 Claims, 4 Drawing Sheets

FOREIGN PATENT DOCUMENTS

| | | |
|---|---|---|
| JP | 2001-298655 | 10/2001 |
| JP | 2003-061936 | 3/2003 |
| JP | 2003-83730 | 3/2003 |
| JP | 2003-207324 | 7/2003 |
| JP | 2003-324751 | 11/2003 |
| JP | 2004-302524 | 10/2004 |

OTHER PUBLICATIONS

Patent Abstract of Japan, JP 2003-061936, published: Mar. 4, 2003, Applicant: Sanyo Electric Co. Ltd., Matsumoto Yukinori et al. (See p. 1 for patent listing).

International Search Report, dated Jun. 4, 2007.

* cited by examiner

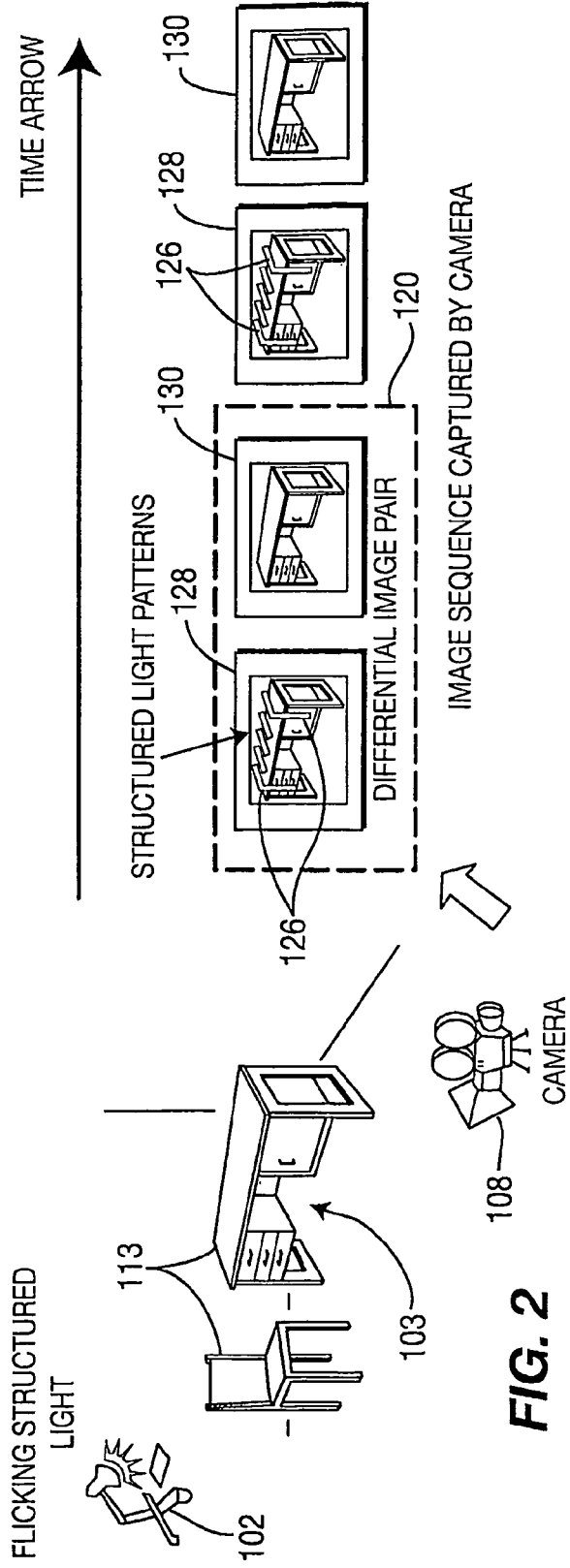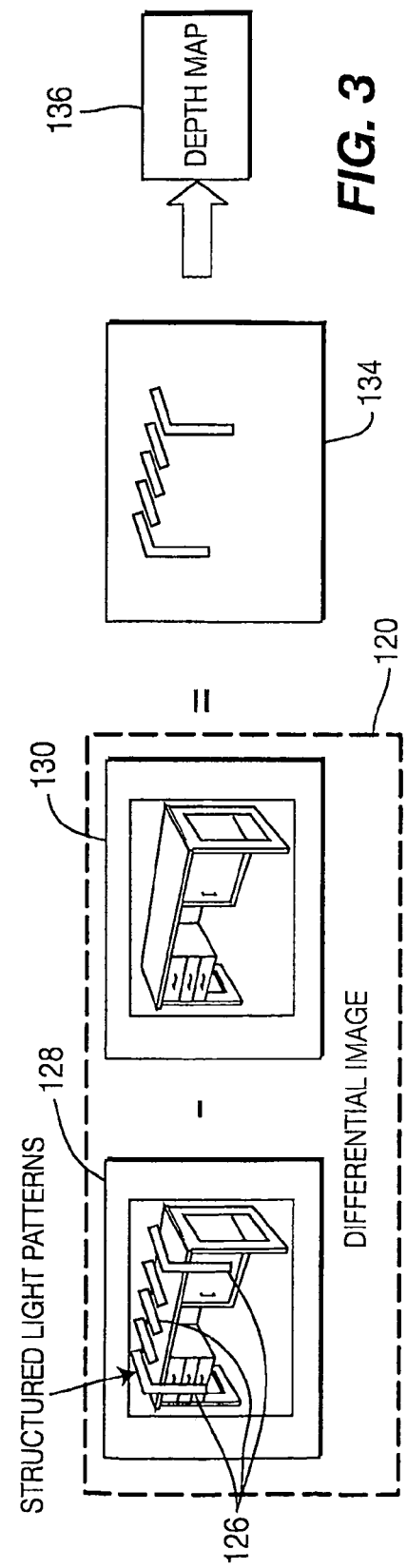

METHOD AND SYSTEM FOR THREE-DIMENSIONAL MODEL ACQUISITION

This application claims the benefit, under 35 U.S.C. §365 of International Application PCT/US2006/036839, filed 21 Sep. 2006, which was published in accordance with PCT Article 21(2) on 27 Mar. 2008, in English.

FIELD OF THE INVENTION

The present invention generally relates to digital graphics and, more particularly, to systems and methods for acquiring three-dimensional models of images.

BACKGROUND OF THE INVENTION

Three-dimensional (3D) model acquisition, also known as 3D geometry recovery, 3D shape reconstruction, etc, is a challenging problem involving the recovery of 3D geometry (often represented as polynomial meshes) of objects and scenes from images taken by, for example, image sensors. There has been substantial work on the recovery of depth information or three-dimensional (3D) geometry of objects. One technique belongs to a category of approaches known as structured light methods, which recover the 3D geometry of an object by projecting specially designed light patterns onto the surface of an object and estimating the depth (i.e., the distance between the point on the surface to the camera) by analyzing the deformations of the projected patterns.

Among many techniques for 3D geometry recovery, structured light approaches are highly accurate and can be implemented in real-time, making them promising for real-world applications. Nevertheless, current structured light approaches have several limitations that hinder their application to real-world scenarios. For example, to realize accurate acquisition, these techniques require high power light and high contrast patterns to be projected onto the object surfaces. This is often unacceptable to human subjects such as actors in a movie scene.

In addition, current structured light techniques usually entail assuming that there is little or no texture on the object surface. The presence of the object texture would affect the appearance of the structured light patterns. Therefore, textures can significantly degrade the accuracy. Even further, when the captured images/videos are also used for content creation, such as making movies, the presence of structured light in the images and videos is often undesirable.

The various 3D acquisition techniques can be classified as active and passive approaches. Passive approaches acquire 3D geometry from images or videos taken under regular lighting conditions. 3D geometry is computed using the geometric or photometric features extracted from images and videos. Two of the most widely used approaches are stereo algorithm and photometric techniques. Stereo algorithm techniques estimate depth based on the disparity of a stereo image pair that is taken by two cameras with different viewing angles. Disparity is estimated by comparing the pixels in the stereo image pair and computing the coordinate difference. Photometric techniques estimate the normal of a surface based on the shading effect caused by surface orientations. For real-world images, both methods are inaccurate and require high computational cost. Stereo algorithms fail to estimate the depths of the pixels on flat regions (regions without texture). The photometric technique requires the materials (i.e. BRDF, Bidirectional Reflectance Distribution Function) of the object surfaces to be known a priori.

In contrast, active approaches are able to achieve high accuracy and real-time speed. Laser scanning, for example, is a technique that includes projecting laser light onto a surface and estimating the depth based on the time-of-flight principle or the deformation of the light pattern. The application of laser scanning is very restricted, however.

Another technique referred to as structured light is preferred in the art. Structured light techniques project visible or invisible (infrared) patterns onto the surfaces of objects and estimate the depth according to the deformation of the patterns. Structured light approaches have been extensively studied in the computer vision community. The state-of-the-art techniques include composite structured light, which uses multiple stripes instead of single stripe and color structured light, and implements color to distinguish and identify the stripes. However, to achieve high accuracy of depth estimation, these approaches require high strength structured light and/or smoothness of a surface such that the surface texture would not interfere with the structured light patterns. As such, recovering 3D geometry of real-world objects using currently available techniques is intrusive and inaccurate.

SUMMARY OF THE INVENTION

The concepts of the present invention address the deficiencies of the prior art by providing a method and system for the acquisition of three-dimensional geometric information of real-world objects and images with high accuracy and real-time speed.

In one embodiment of the present invention, a method for acquiring geometric information of images includes illuminating an object with a structured pattern at a modulated rate unperceivable by the human eye, capturing images of the object at a rate at which a differential pair of images is obtained such that a first image of the pair of images is illuminated and a second image of the pair of images is not illuminated, and comparing the differential pair of images to determine geometric information for the object. The method can further include implementing a frame selection process to recover a sequence of images that were not illuminated for the reproduction and display of a scene.

In an alternate embodiment of the present invention, a system for acquiring geometric information of images includes a modulated light source configured to provide light energy at a rate unperceivable by the human eye for illuminating an image object, a camera configured to capture images of the object at a rate at which a differential pair of images is obtained such that a first image of the pair of images is illuminated and a second image of the pair of images is not illuminated, and a comparison module configured to compare the differential pair of images to determine geometric information for the object. The comparison module of the system can include a depth estimator configured to estimate depths of an object according to deformations of determined structured patterns of said modulated light, a comparison module configured to determine a respective three dimensional mesh from the depth map for determining a three dimensional model of the object and a frame selection module configured to eliminate frames illuminated by the modulated light to provide a sequence of images not illuminated by the modulated light for use in reproduction or display.

BRIEF DESCRIPTION OF THE DRAWINGS

The teachings of the present invention can be readily understood by considering the following detailed description in conjunction with the accompanying drawings, in which:

FIG. 2 depicts a diagram of a method for acquiring geometric information of images in accordance with one embodiment of the present invention;

FIG. 3 depicts a diagram of a difference analysis process for producing a depth map in accordance with an illustrative embodiment of the present invention;

Figure 1:
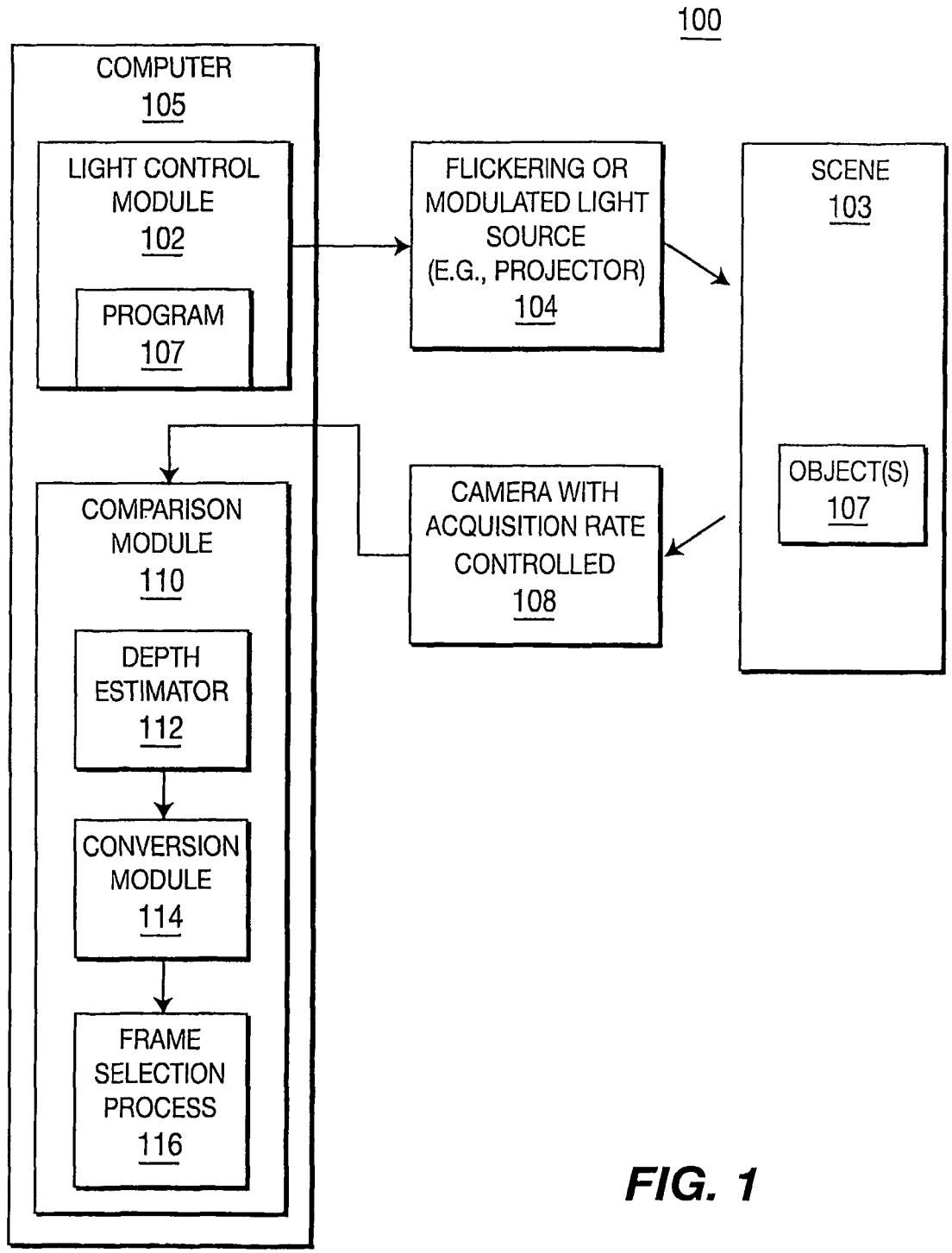
FIG. 1 depicts a high level block diagram of a system for acquiring geometric information from images in accordance with an embodiment of the present invention.

It should be understood that the drawings are for purposes of illustrating the concepts of the invention and are not necessarily the only possible configuration for illustrating the invention. To facilitate understanding, identical reference numerals have been used, where possible, to designate identical elements that are common to the figures.

DETAILED DESCRIPTION OF THE INVENTION

The present invention addresses the deficiencies of the prior art by providing a method and system for acquiring three-dimensional models from images. Although the present invention will be described primarily within the context of a video recording system, the specific embodiments of the present invention should not be treated as limiting the scope of the invention. It will be appreciated by those skilled in the art and informed by the teachings of the present invention that the concepts of the present invention can be advantageously applied in substantially any digital imaging system, which is capable of being used to acquire geometrical information, and/or any recording system including recording data by telephone, digital camera, movie camera and the like. That is, the following description illustrates the principles of the present invention. It will thus be appreciated that those skilled in the art will be able to devise various arrangements that, although not explicitly described or shown herein, embody the principles of the invention and are included within its spirit and scope.

The elements depicted in the Figures can be implemented in various forms of hardware, software or combinations thereof. Preferably, these elements are implemented in a combination of hardware and software on one or more appropriately programmed general-purpose devices, which can include a processor, memory and input/output interfaces. Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudo-code, and the like represent various processes which may be substantially represented in computer readable media and so executed by a computer or processor, whether or not such computer or processor is explicitly shown.

FIG. 1 depicts a high level block diagram of a system for acquiring geometric information from images in accordance with an embodiment of the present invention. The system 100 of FIG. 1 illustratively comprises a computer 105, a light source 104, a camera 108 and an image or scene 103 to be recorded. In the system 100 of FIG. 1, the computer illustratively comprises a light control module 102, which stores various programs for controlling the light source 104 and a comparison module 110. The comparison module 110 of the computer 105 illustratively comprises a depth estimator 112, a conversion module 114 and a frame selection module 116.

In the system 100 of FIG. 1, a flickering or modulated light source 104 projects structured patterns of light onto an object 113 in the scene 103. A camera 108 is provided with a relatively high frame rate that captures the scene illuminated by the structured light. In one embodiment of the present invention, the frame rate of the camera is equal to or greater than the flickering rate of the structured light. The light source 104 of FIG. 1 is connected to the PC 105, which controls the generation of the structured light patterns and simulates the flickering effects. Structured patterns can be generated by, for example, the stored programs 107 in the light control module 102. That is, the flickering effects can be generated by switching on and off the light pattern in accordance with details contained in the program 107.

To minimize the light disturbance caused by the light source on the objects, in one embodiment of the present invention, the system 100 of FIG. 1 utilizes a flickering frequency for the light source 104 that is high enough so that the human vision system is unable to perceive it (e.g., 60 Hz or greater). That is, the light source provides structured light invisible to human eyes based on the fact that the sensitivity of human eyes is substantially reduced when the frequency of a flickering light source exceeds a certain threshold. As such, when objects are captured using the camera 108 the light is invisible and the disturbance is minimal if any. With the relatively high frame rate, images are captured as differential image pairs. The differential image pairs comprise two consecutive images in the captured image sequence in which one is lit by the structured light and the other is not. By analyzing differences between the images in the differential image pair, the textures on the object surface can be eliminated, while the shape and color of the structured light patterns are preserved.

For example, in one embodiment of the present invention, the comparison module 110 of the computer 105 analyzes the differences between the images in the differential image pairs and eliminates the non-illuminated portions of the object in a scene. That is, in one embodiment of the present invention, a difference analysis includes comparing an image including the structured light patterns to the image not having the structured light pattern and determining any differences.

FIG. 2 depicts a diagram of an example application of a method for acquiring geometric information of images in accordance with one embodiment of the present invention. In FIG. 2, structured light patterns 126, in accordance with embodiments of the present invention, are acquired by the camera 108 in a first image 128 of a differential image pair 120. The second image 130 of each pair 120 captured by the camera 108 does not include the structured light pattern.

For example, in one embodiment of the present invention, color structured light projects color stripes onto a scene to be used for estimating the depth of an illuminated object. More specifically, defining the color vector at a point on the surface seen by the camera 108 as $S=[s^r, s^g, s^b]^T$, the projector crosstalk matrix can be characterized according to equation one (1), which follows:

$$X = \begin{bmatrix} x_{11} & x_{12} & x_{13} \\ x_{21} & x_{22} & x_{23} \\ x_{31} & x_{32} & x_{33} \end{bmatrix}, \quad (1)$$

and the scene albedo matrix can be characterized according to equation two (2), which follows:

$$F = \begin{bmatrix} \rho_{11} & 0 & 0 \\ 0 & \rho_{22} & 0 \\ 0 & 0 & \rho_{33} \end{bmatrix}. \quad (2)$$

Furthermore, the projector illumination vector can be characterized as $P=[p^r \cos \theta, p^g \cos \theta, p^b \cos \theta]^T$, where $\theta$ is the angle between the surface normal and the projector incidence light, the environment lighting vector can be characterized as $E=[e^r, e^g, e^b]^T$ and an ambient light vector be characterized as $O=[o^r, o^g, o^b]^T$. The above quantities can be related according to equation three (3), which follows:

$$S=XF(P+E)+O. \quad (3)$$

The structured light color $p^r, p^g, p^b$ in the illumination vector P is determined given the color vector S observed by the camera. Once $p^r, p^g, p^b$ is determined, the values are matched to the structured light patterns and are used to estimate the depth of a relative point on the surface of an object. By subtracting the two frames in the differential image pairs, the effects of the environmental lighting and ambient light can be characterized according to equation four (4), which follows:

$$\delta_t S = S(t+1) - S(t) = XF(P+E) + O - [XFE + O] = XFP, \quad (4)$$

where S(t) and S(t+1) are the frames captured by the camera in the time t and t+1. By estimating the cross talk matrix X, the camera-projector rectification stage, FP, can be determined by multiplying $\delta_t S$ with $X^{-1}$. However, the scene albedo vector F and surface orientation terms in the illumination vector still need to be eliminated. To do this, a spatial difference based method is employed to factor out the albedo and surface orientation. In one embodiment of the present invention, the scene albedo vector, FP, can be characterized according to equation five (5), which follows:

$$FP = [\rho^r \cos \theta p^r, \rho^g \cos \theta p^g, \rho^b \cos \theta p^b]. \quad (5)$$

It is assumed that the albedo of neighboring pixels is substantially the same as described above because, typically, an albedo map is piecewise constant and the surface is smooth. As such, in equation (5) above, $\theta$ is close to constant within a local region. It is further assumed that a pixel 1 and a pixel 2 are neighborhood pixels. As such, excluding the scene albedo and surface orientation terms, equation (5) can be rewritten and characterized according to equation six (6) which follows:

$$\delta \log FP = \log FP_1 - \log FP_2 = \left[ \log \frac{p_1^r}{p_2^r}, \log \frac{p_1^g}{p_2^g}, \log \frac{p_1^b}{p_2^b} \right]. \quad (6)$$

Therefore, if the log difference $\delta \log FP$ is utilized to calculate correspondence and perform depth estimation, the scene albedo and local surface orientation are considered invariant to such determinations. Although the depth estimation example is described above as implementing a color structure light, it should be appreciated by those skilled in the art and informed by the teachings herein that depth calculations can be realized using techniques for depth estimation from composite structured light or color structured light methods and the like.

For example and referring back to FIG. 1, the comparison module 110 includes a depth estimator 112, which estimates the depth according to the deformation of the structured patterns using, in one embodiment, the log difference, $\delta \log FP$, as characterized in equation (6) above. The depth estimator 112 outputs a depth map of the scene and objects in it.

Figure 4:
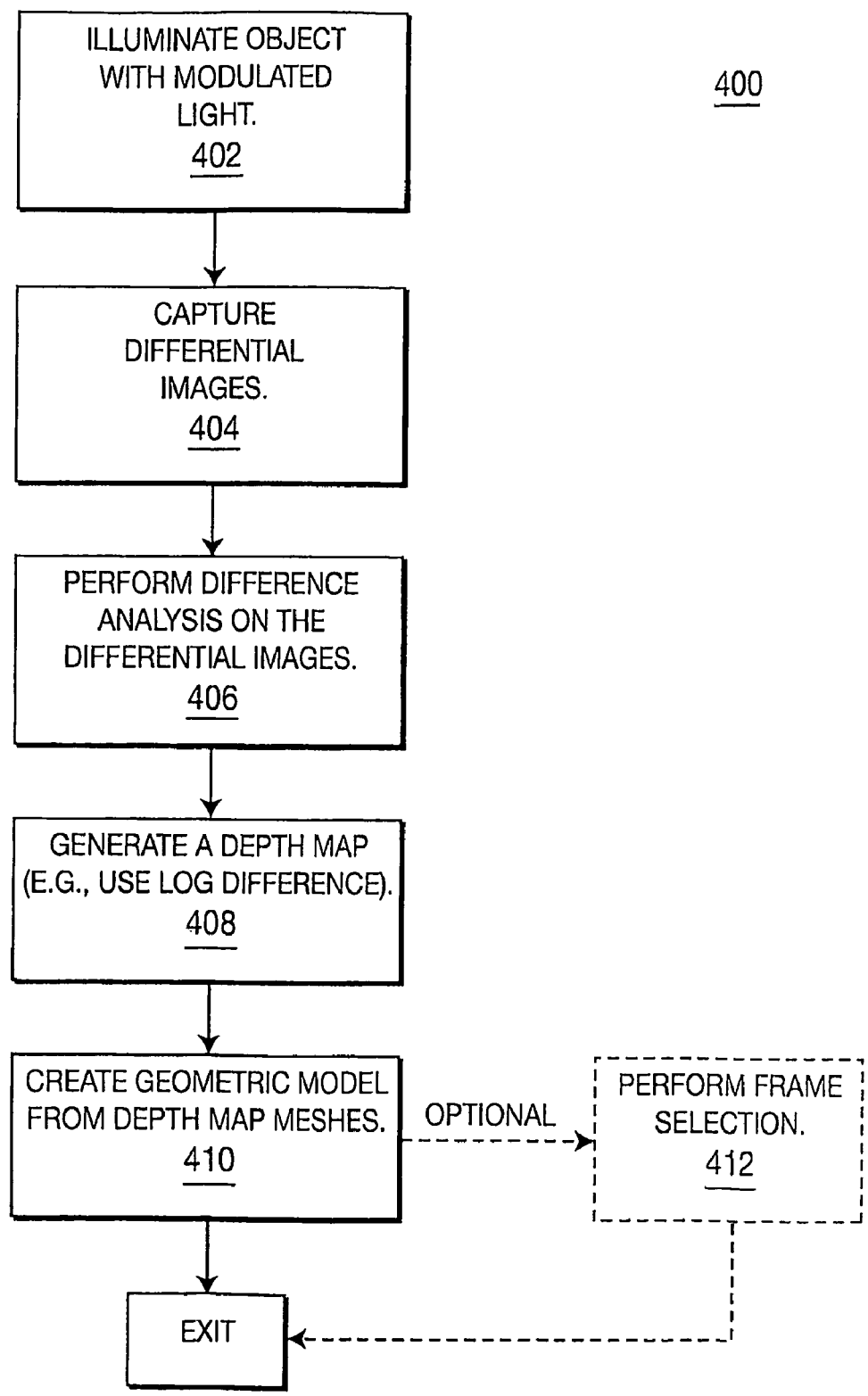
FIG. 4 depicts a flow diagram of a method for acquiring geometric information of images in accordance with an embodiment of the present invention.

FIG. 3 depicts a diagram of a difference analysis process for producing a depth map in accordance with an illustrative embodiment of the present invention. In the example of FIG. 4, a difference analysis is applied to a differential image pair 120 to separate portions of an object image 130 from an illuminated object image 128 to determine a structured pattern 134. The structured pattern 134 is then used by, for example, the depth estimator 112 of FIG. 1 to determine a depth map 136.

Subsequently, the depth information (e.g., the depth map) is used to determine a three-dimensional (3D) model for the illuminated object. More specifically and referring back to the embodiment of FIG. 1, the comparison module 110 includes a conversion module 114. In one embodiment of the present invention, the conversion module 114 converts the depth map into 3D meshes and combines multiple meshes taken from different viewpoints into one 3D mesh to produce a 3D model for the illuminated object. There are several existing well-known techniques in the art to convert a range or depth map into a 3D mesh and as such the details of such techniques will not be described in detail herein. For example, in one embodiment, the conversion of the depth map into 3D meshes can be realized by capturing the range images from different angles and then aligning and stitching them together to create a full 3D mesh/model.

Subsequently, image sequences or videos without structured light patterns can be fully recovered in the post-processing stage. More specifically, a frame selection process 116 can be performed by, for example, the frame selection module 116 of FIG. 1 to separate the frames not illuminated by the structure light from the frames illuminated by the structured light to produce an image sequence that does not include images illuminated by the structured light such that reproduction and display of a scene is not negatively affected. Such a process is described in greater detail below.

FIG. 4 depicts a flow diagram of a method for acquiring geometric information of images in accordance with an embodiment of the present invention. The method 400 begins at step 402 in which an object is illuminated with flickering light as described above. In one embodiment, the flickering light is invisible to human eyes and can comprise a frequency of 60 Hz, although other frequencies can be used. As such, high accuracy and real-time speed can be achieved even for objects with strong textures. The method 400 then proceeds to step 404.

At step 404, the images produced as the flickering light illuminates the reference object are captured by a camera as described above. The method 400 then proceeds to step 406.

At step 406, a differential analysis is applied to a produced differential image pair (e.g., a pair of images produced in which a first image is lit by the flickering structured light and a second is not) to identify and isolate the structured light pattern produced on the illuminated object. The method 400 then proceeds to step 408.

At step 408, a depth map is generated from a result of the differential image analysis of step 406. The method then proceeds to step 410.

At step 410, 3D models of the objects are created from the mesh object of the depth map. The method 400 is then exited.

The method 400 of the present invention can further include step 412. That is, at step 412, a frame selection process is employed to discard the image frames illuminated by the flickering structured light, such that the image sequence of frames that were not illuminated can be recovered.

More specifically, a frame selection process 116 can be performed by, for example, the frame selection module 116 of FIG. 1 to separate the frames not illuminated by the structure light from the frames illuminated by the structured light to produce an image sequence that does not include images illuminated by the structured light such that reproduction and display of a scene is not negatively affected or corrupted by illumination.

Figure 5:
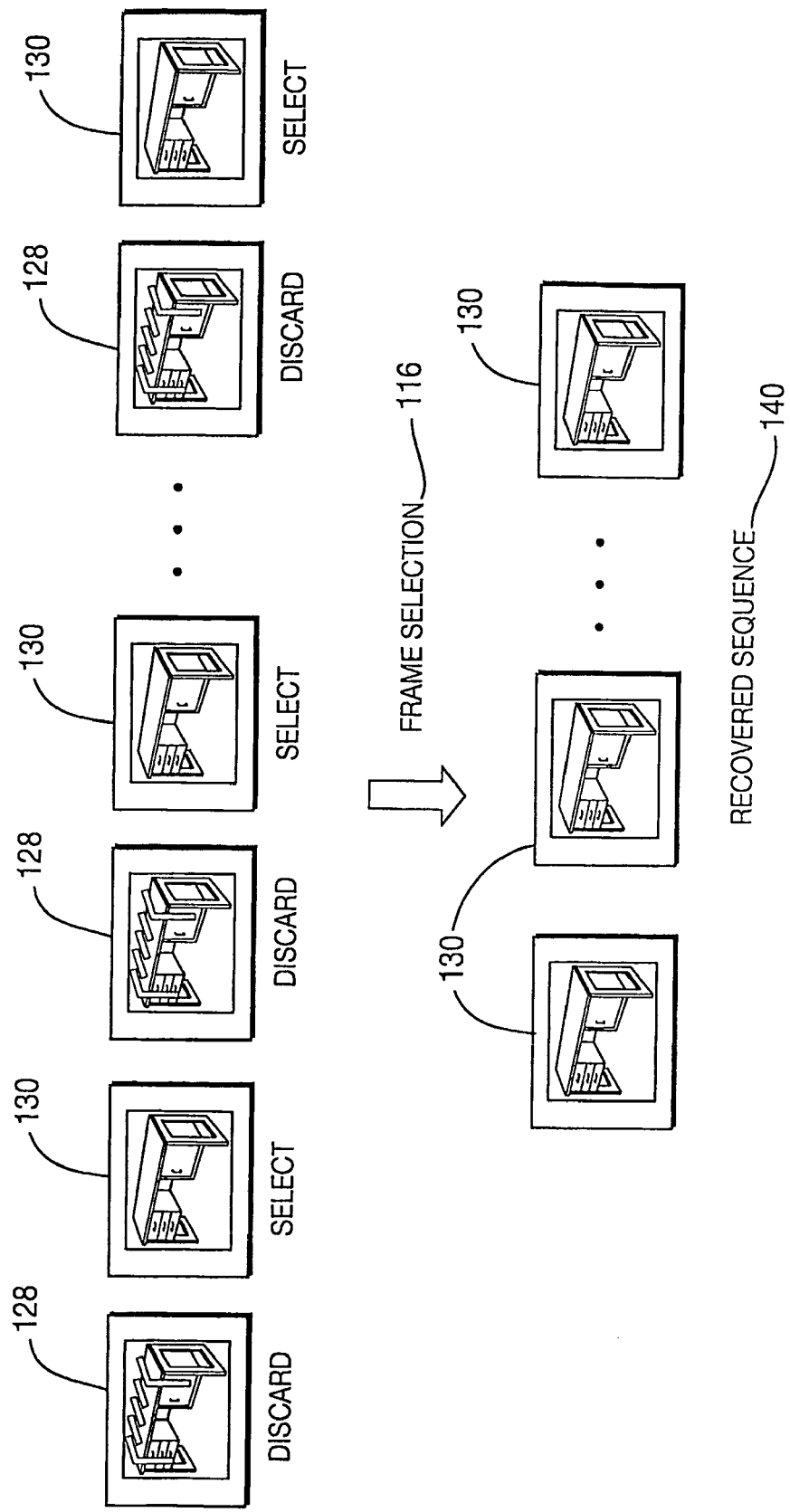
FIG. 5 depicts a diagram of a frame selection process implemented to produce an image sequence or video having no illuminated images in accordance with an embodiment of the present invention.

For example, FIG. 5 depicts a diagram of a frame selection process implemented to produce an image sequence having no illuminated images in accordance with an embodiment of the present invention. The selection process of FIG. 5 identifies frames having structured light patterns. For example, in one embodiment of the present invention, the identification of illuminated images can be realized by matching the patterns recovered from the difference analysis performed by the difference estimator 112, as described above, to image frames to identify the image frames having the structured light pattern. After the frames with the structured light patterns are identified, these frames can be excluded from an original image sequence to generate an image sequence that does not include any illuminated images. Referring to FIG. 5, frames with structured light 128 are removed or discarded and the frames 130 are selected by the frame selection process. As such, a recovered sequence 140 includes frames that are needed for the reproduction or display of video, motion picture, still images and the like.

Having described preferred embodiments for the acquisition of three-dimensional geometric information of real-world objects and scenes (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. While the forgoing is directed to various embodiments of the present invention, other and further embodiments of the invention may be devised without departing from the basic scope thereof. As such, the appropriate scope of the invention is to be determined according to the claims, which follow.

The invention claimed is:

1. A method for acquiring geometric information of images, comprising:
   illuminating an object with a structured pattern at a modulated rate unperceivable by the human eye;
   capturing, by a camera, images of said object at a frame rate at which a differential pair of images is obtained such that a first image of the pair of images is illuminated and a second image of the pair of images is not illuminated, wherein the frame rate that said images are captured is higher than said modulated rate;
   comparing the differential pair of images to determine geometric information for said object; and
   implementing a frame selection process to recover a sequence of images that were not illuminated, wherein said sequence of images that were not illuminated are used for the reproduction and display of a scene.

2. The method of claim 1, said geometric information is determined by subtracting said second image from said first image and evaluating deformations of a resulting light pattern.

3. The method of claim 2, wherein object depths are determined by evaluating the deformations of said resulting light pattern.

4. The method of claim 1, wherein a depth map is created from said determined geometric information.

5. The method of claim 4, wherein a respective three dimensional mesh is determined from said depth map and said three dimensional mesh is used to construct a three dimensional model of said object.

6. The method of claim 4, comprising generating the depth map using a log difference method to eliminate at least one of albedo effects, environmental lighting and shading.

7. The method of claim 1, comprising eliminating at least one of albedo effects, environmental lighting and shading to create a model of said object.

8. A system for acquiring geometric information of images, comprising:
   a modulated light source configured to provide light energy at a rate unperceivable by the human eye for illuminating an image object;
   a camera configured to capture images of said object at a frame rate at which a differential pair of images is obtained such that a first image of the pair of images is illuminated and a second image of the pair of images is not illuminated, wherein the frame rate that said images are captured is higher than said modulated rate;
   a comparison module configured to compare the differential pair of images to determine geometric information for said object; and
   a frame selection module configured to eliminate frames illuminated by the modulated light to provide a sequence of images not illuminated by the modulated light.

9. The system of claim 8, comprising a depth estimator configured to estimate depths in the image object according to deformations of structured patterns of said modulated light.

10. The system of claim 9, wherein said depth estimator subtracts said second image from said first image and evaluates deformations of a resulting light pattern to determine object depths.

11. The system of claim 8, wherein a depth map is created from said determined geometric information.

12. The system of claim 11, comprising a comparison module configured to determine a respective three dimensional mesh from said depth map for determining a three dimensional model of said object.

13. The system of claim 8, wherein said object is illuminated from different viewpoints and said camera captures images of said object from the different viewpoints.

14. The system of claim 13, wherein a respective depth map is created from the determined geometric information of the different viewpoints and a respective three dimensional mesh is determined from the depth maps.

15. The system of claim 14, wherein the different meshes are combined to determine a three dimensional model of said object.

16. The system of claim 8, wherein the modulated light source includes a projector controlled by a computer.

17. The system of claim 8, wherein the camera captures images at a frame rate equal to or higher than the rate of the modulated light.

18. The system of claim 8, wherein the camera includes a video camera.

19. The system of claim 8, wherein the object is textured and the comparison module eliminates at least one of albedo effects, environmental lighting and shading.

* * * * *